(12) United States Patent
Warita

(10) Patent No.: US 12,138,891 B2
(45) Date of Patent: Nov. 12, 2024

(54) LEATHER-LIKE SHEET

(71) Applicant: KURARAY CO., LTD., Kurashiki (JP)

(72) Inventor: Masato Warita, Okayama (JP)

(73) Assignee: KURARAY CO., LTD., Kurashiki (JP)

( * ) Notice: Subject to any disclaimer, the term of this patent is extended or adjusted under 35 U.S.C. 154(b) by 108 days.

(21) Appl. No.: 17/757,871

(22) PCT Filed: Dec. 3, 2020

(86) PCT No.: PCT/JP2020/045139
§ 371 (c)(1),
(2) Date: Jun. 22, 2022

(87) PCT Pub. No.: WO2021/131589
PCT Pub. Date: Jul. 1, 2021

(65) Prior Publication Data
US 2023/0033018 A1  Feb. 2, 2023

(30) Foreign Application Priority Data
Dec. 25, 2019  (JP) ................. 2019-235313

(51) Int. Cl.
*B32B 27/12*    (2006.01)
*B32B 5/02*     (2006.01)
(Continued)

(52) U.S. Cl.
CPC .............. *B32B 27/12* (2013.01); *B32B 5/022* (2013.01); *B32B 7/022* (2019.01); *B32B 7/12* (2013.01);
(Continued)

(58) Field of Classification Search
CPC ..................... D06N 2211/28; B32B 9/025
See application file for complete search history.

(56) References Cited

U.S. PATENT DOCUMENTS

2003/0022575 A1* 1/2003 Yoneda .................... D06N 3/14
                                                    442/104
2017/0305126 A1* 10/2017 Takeshita ................ B32B 37/06
(Continued)

FOREIGN PATENT DOCUMENTS

CN         103132344       6/2013
EP         2287395         2/2011
(Continued)

OTHER PUBLICATIONS

International Search Report dated Feb. 16, 2021, in PCT/JP2020/045139, with English translation, 7 pages.
(Continued)

*Primary Examiner* — Alicia J Weydemeyer
(74) *Attorney, Agent, or Firm* — Grüneberg and Myers PLLC

(57) ABSTRACT

A leather-like sheet includes: a fiber base material; an intermediate resin layer stacked on one surface of the fiber base material; and a surface resin layer stacked on the intermediate resin layer. The surface resin layer contains a polyether-based polyurethane and spherical fine particles having a heat resistance at 200° C., and has a content ratio of the spherical fine particles of 5 to 40 mass %. The spherical fine particles have a specific heat of 0.95 kJ/(kg·K) or more, a particle size $D_{50}$ (median diameter) at a cumulative distribution of 50 vol %, of 2.5 to 10 μm, and a particle size $D_{10}$ at a cumulative distribution of 10 vol % of the spherical fine particles which satisfies a condition that a particle size dispersity $D_{50}/D_{10} \leq 3$.

6 Claims, 1 Drawing Sheet

(51) Int. Cl.
    *B32B 7/022*     (2019.01)
    *B32B 7/12*     (2006.01)
    *B32B 27/08*     (2006.01)
    *B32B 27/32*     (2006.01)
    *B32B 27/40*     (2006.01)

(52) U.S. Cl.
    CPC ............ *B32B 27/08* (2013.01); *B32B 27/322* (2013.01); *B32B 27/40* (2013.01); *B32B 2250/03* (2013.01); *B32B 2260/021* (2013.01); *B32B 2260/046* (2013.01); *B32B 2264/0214* (2013.01); *B32B 2264/202* (2020.08); *B32B 2264/305* (2020.08); *B32B 2307/306* (2013.01); *B32B 2307/546* (2013.01); *B32B 2307/554* (2013.01); *B32B 2307/732* (2013.01)

(56) References Cited

U.S. PATENT DOCUMENTS

| | | | |
|---|---|---|---|
| 2020/0157373 | A1 | 5/2020 | Fukada et al. |
| 2021/0285152 | A1 | 9/2021 | Ashida et al. |

FOREIGN PATENT DOCUMENTS

| | | | | |
|---|---|---|---|---|
| JP | H02-182980 | | 7/1990 | |
| JP | H05-25410 | | 2/1993 | |
| JP | H06-192967 | | 7/1994 | |
| JP | H06192967 | A * | 7/1994 | |
| JP | H07-150479 | | 6/1995 | |
| JP | H10-251978 | | 9/1998 | |
| JP | 2005-113318 | | 4/2005 | |
| JP | 2007-314919 | | 12/2007 | |
| JP | 2018-123443 | | 8/2008 | |
| JP | 2016067666 | | 5/2016 | |
| WO | 2009/125758 | | 10/2009 | |
| WO | WO-2015053274 | A1 * | 4/2015 | ............ B32B 27/08 |
| WO | 2015/142340 | | 9/2015 | |
| WO | 2018/181147 | | 10/2018 | |
| WO | 2019/216164 | | 11/2019 | |

OTHER PUBLICATIONS

Written Opinion dated Feb. 16, 2021, in PCT/JP2020/045139, 4 pages.
Extended European Search Report dated Apr. 17, 2024, in European Application No. 20907174.5, 6 pages.

* cited by examiner

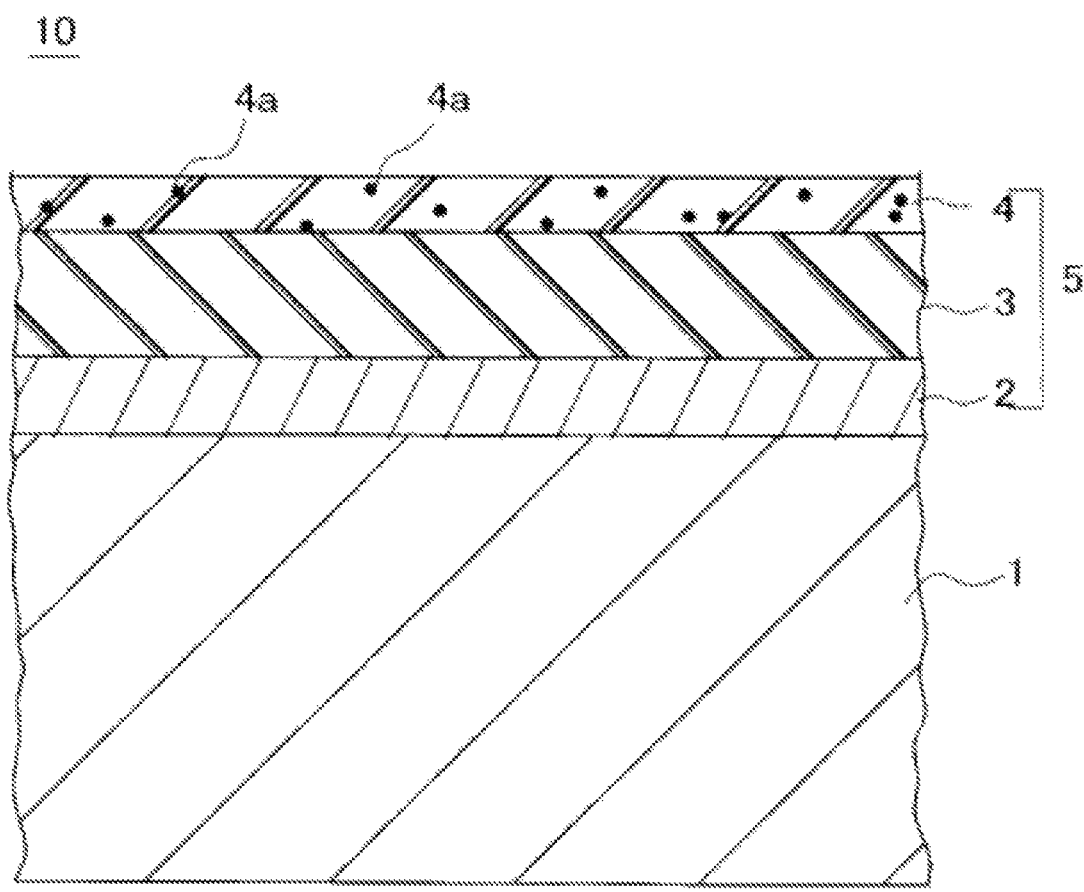

LEATHER-LIKE SHEET

CROSS-REFERENCE TO RELATED APPLICATIONS

This application is the National Stage entry under § 371 of International Application No. PCT/JP2020/045139, filed on Dec. 3, 2020, and which claims the benefit of priority to Japanese Application No. 2019-235313, filed on Dec. 25, 2019. The content of each of these applications is hereby incorporated by reference in its entirety.

TECHNICAL FIELD

The present invention relates to a leather-like sheet.

BACKGROUND ART

Conventionally, leather-like sheets such as artificial leather and synthetic leather have been used for shoes and clothing, and interior materials of vehicles and articles of furniture. Such leather-like sheets are put to uses in which their surfaces come into contact with other objects. In such uses, leather-like sheets are required to have the property of being resistant to wear caused by friction against other objects.

For example, PTL 1 listed below discloses a leather-like sheet in which a resin skin layer composed mainly of a non-yellowing polycarbonate-based urethane resin is stacked on a surface of a natural leather base material via an adhesive layer made of a resin composed mainly of a polycarbonate-based urethane resin, wherein the resin skin layer contains 3 to 50 parts by weight of a spherical fine powder having an average particle size of 10 μm or less, per 100 parts by weight of the resin composed mainly of the non-yellowing polycarbonate-based urethane. PTL 1 also discloses, as the spherical fine powder, a melamine resin, a phenol resin, and a benzoguanamine resin.

For example, PTL 2 listed below discloses a ball skin material including a fiber base material, and a surface resin layer disposed on one surface of the fiber base material, the surface resin layer containing an elastic polymer, inorganic particles, and a protein powder.

CITATION LIST

Patent Literatures

[PTL 1] Japanese Laid-Open Patent Publication No. H7-150479
[PTL 2] Japanese Laid-Open Patent Publication No. 2016-67666

SUMMARY OF INVENTION

Technical Problem

For example, shoes for use in sports played in gymnasiums are repeatedly rubbed against the floor during games, and the rubbed portions may be melted by frictional heat. Also, sports shoes for use in sports played in gymnasiums are repeatedly subjected to bending by movements of the players. For that reason, for sports shoes for use in sports played in gymnasiums, there has been a need for leather-like sheets with a surface having a combination of high frictional melt resistance, which is the property of being resistant to melting by frictional heat, and high bending resistance.

It is an object of the present invention to provide a leather-like sheet with a surface having a combination of high frictional melt resistance and high bending resistance.

Solution to Problem

An aspect of the present invention is directed to a leather-like sheet including: a fiber base material; an intermediate resin layer stacked on one surface of the fiber base material; and a surface resin layer stacked on the intermediate resin layer, wherein the surface resin layer contains a polyether-based polyurethane and spherical fine particles having a heat resistance at 200° C., and a content ratio of the spherical fine particles is 5 to 40 mass %, and the spherical fine particles has a specific heat of 0.95 kJ/(kg·K) or more, and a particle size $D_{50}$ (median diameter) at a cumulative distribution of 50 vol %, of 2.5 to 10 μm, and a particle size $D_{10}$ at a cumulative distribution of 10 vol % of the spherical fine particles satisfies a condition that a particle size dispersity $D_{50}/D_{10} \leq 3$. Such a leather-like sheet provides a leather-like sheet with a surface having a combination of high frictional melt resistance and high bending resistance.

Examples of the spherical fine particles include melamine resin-silica composite particles, benzoguanamine resin particles, and polytetrafluoroethylene resin particles.

It is preferable that the surface resin layer has a thickness of 10 to 60 μm, from the viewpoint of obtaining a leather-like sheet that offers a good balance between high frictional melt resistance, high bending resistance, and mechanical properties.

It is preferable that the number of cycles of a flexing endurance test at which cracking occurs in the surface resin layer is 300000 or more, when the flexing endurance test is performed on the leather-like sheet in an environment of 20° C. using a flexometer, from the viewpoint of obtaining a leather-like sheet that offers a particularly good balance between high frictional melt resistance and high bending resistance.

It is preferable that the fiber base material includes a non-woven fabric including ultrafine fibers having a fineness of 0.5 dtex or less, and an elastic polymer impregnated in the non-woven fabric, from the viewpoint of obtaining a leather-like sheet that offers a good balance between high frictional melt resistance, high bending resistance, and mechanical properties.

Advantageous Effects of Invention

According to the present invention, it is possible to obtain a leather-like sheet with a surface having a combination of high frictional melt resistance and high bending resistance.

BRIEF DESCRIPTION OF DRAWING

The FIGURE is a schematic cross-sectional view of a leather-like sheet 10 according to an embodiment.

DESCRIPTION OF EMBODIMENT

Hereinafter, an embodiment of a leather-like sheet according to the present invention will be described in detail with reference to the drawing. The FIGURE is a schematic cross-sectional view of a leather-like sheet 10 according to the present embodiment.

Referring to the FIGURE, the leather-like sheet 10 includes a fiber base material 1, an intermediate resin layer 3 bonded to one surface of the fiber base material 1 via an adhesive layer 2, and a surface resin layer 4 stacked on the intermediate resin layer 3. The resin layers, including the adhesive layer 2, the intermediate resin layer 3, and the surface resin layer 4, form a grain-finished resin layer 5. The grain-finished resin layer 5 is a layer that imparts an appearance and a tactile impression that resemble those of a grain surface of natural leather to the leather-like sheet 10. The grain-finished resin layer 5 may further include another layer such as a topcoat layer as needed.

The surface resin layer 4 contains an elastic polymer including a polyether-based polyurethane, and spherical fine particles 4a dispersed in the elastic polymer and having a heat resistance at 200° C. The spherical fine particles 4a have a specific heat of 0.95 kJ/(kg·K) or more, and a particle size $D_{50}$ (median diameter) at a cumulative distribution of 50 vol %, of 2.5 to 10 μm, and a particle size $D_{10}$ at a cumulative distribution of 10 vol % of the spherical fine particles 4a satisfies a condition that a particle size dispersity $D_{50}/D_{10} \leq 3$. By including an elastic polymer including a polyether-based polyurethane and the above-described spherical fine particles having a heat resistance at 200° C. in the surface resin layer 4, a surface having a combination of high frictional melt resistance and high bending resistance is imparted to the leather-like sheet 10.

As the fiber base material, fiber base materials composed mainly of a non-woven fabric, a woven fabric, a knitted fabric or a sheet formed by a combination thereof conventionally used for production of a leather-like sheet, and into which an elastic polymer is further impregnated as needed may be used without any particular limitation. Among these, a fiber base material including a non-woven fabric, in particular, a non-woven fabric into which an elastic polymer has been impregnated and that includes ultrafine fibers having a fineness of 0.5 dtex or less is preferable from the viewpoint of ease of obtaining a leather-like sheet that is dense and has high mechanical strength.

The fibers that form the fiber base material include ultrafine fibers having a fineness of preferably 0.5 dtex or less, and more preferably 0.0001 to 0.2 dtex, from the viewpoint of ease of obtaining a leather-like sheet with low fiber density unevenness and high uniformity. Here, the fineness is determined by imaging a cross section of the napped artificial leather that is parallel to the thickness direction thereof using a scanning electron microscope (SEM) at a magnification of 3000×, and calculating an average value of the diameters of 15 evenly selected fibers by using the density of the resin that forms the fibers.

The type of the resin that forms the fibers is not particularly limited. Specific examples of the resin that forms the fibers include synthetic fibers including, for example, polyamide resins such as polyamide 6, polyamide 66, polyamide 610, aromatic polyamide, and a polyamide elastomer; polyester resins such as polyethylene terephthalate (PET), polytrimethylene terephthalate, polybutylene terephthalate, and a polyester elastomer; acrylic resins; olefin resins; and polyvinyl alcohol resins, and various natural fibers and semi-synthetic fibers. These may be used alone or in a combination of two or more. As the method for producing a synthetic fiber, for example, a melt-spinning method in which a resin is melted at a temperature greater than or equal to the melting point, and is extruded from an extruder, a dry solution spinning method in which a polymer solution is extruded from pores, and a solvent is evaporated, or a wet solution spinning method in which a polymer solution is spun into a non-solvent can be used without any particular limitation. The non-woven fabric of ultrafine fibers is obtained, for example, by subjecting ultrafine fiber-generating fibers such as island-in-the-sea conjugated fibers to entangling treatment, to form a fiber-entangled body, and subjecting the fiber-entangled body to ultrafine fiber-generating treatment.

The fiber base material may contain an elastic polymer impregnated therein. The type of the elastic polymer impregnated in the fiber base material is not particularly limited, and specific examples thereof include various elastic polymers, including, for example, polyurethane; acrylic elastic bodies such as an acrylonitrile-butadiene copolymer and a copolymer of an acrylic acid ester or a methacrylic acid ester; polyamide-based elastic bodies; and silicone rubber. Among these, polyurethane is particularly preferable from the viewpoint of obtaining a good texture. Note that as the soft segment of the polyurethane, one of a polyester unit, a polyether unit, a polycarbonate unit may be included, or a combination thereof may be used. These may be used alone, or in a combination of two or more.

When the fiber base material contains an elastic polymer impregnated therein, the content ratio of the elastic polymer is preferably such that the mass ratio of the fibers forming the fiber base material to the elastic polymer (fibers/elastic polymer) is in the range of preferably 50/50 to 100/0, and more preferably 60/40 to 95/5. When the content ratio of the elastic polymer is too high, the resulting leather-like sheet tends to have a rubber-like hard texture.

The thickness of the fiber base material is not particularly limited, but is preferably 0.3 to 2.0 mm, and more preferably 0.5 to 1.5 mm.

Referring to the FIGURE, the surface resin layer 4 is stacked on one surface of the fiber base material 1 of the leather-like sheet 10 via the adhesive layer 2 and the intermediate resin layer 3. The surface resin layer 4 is a layer that imparts a surface having a combination of high frictional melt resistance against repeated rubbing of the surface of the leather-like sheet, and high bending resistance that is less likely to cause cracking or the like even against repeated bending. Such a surface resin layer 4 contains the elastic polymer including the polyether-based polyurethane, and the spherical fine particles 4a dispersed in the elastic polymer and having a heat resistance at 200° C.

The spherical fine particles have a heat resistance at 200° C., a specific heat of 0.95 kJ/(kg·K) or more, and a particle size $D_{50}$ (median diameter) at a cumulative distribution of 50 vol %, of 2.5 to 10 μm, and a particle size $D_{10}$ at a cumulative distribution of 10 vol % of the spherical fine particles has a particle size distribution in which a particle size dispersity $D_{50}/D_{10} \leq 3$.

The spherical fine particles having a heat resistance at 200° C. are spherical fine particles that do not melt when heated for 10 minutes in a dryer set at 200° C., as will be described later. When the spherical fine particles do not have a heat resistance at 200° C., the frictional melt resistance is reduced.

The specific heat of the fine particles that satisfy a specific heat of 0.95 kJ/(kg·K) or more is the specific heat of the spherical fine particles as measured by DSC (differential scanning calorimeter) in accordance with JIS K 7123: Testing methods for specific heat capacity of plastics, as will be described later. The specific heat of the spherical fine particles is preferably 0.95 kJ/(kg·K) or more, and more preferably 1.00 kJ/(kg·K) or more. When the specific heat of the spherical fine particles is less than 0.95 kJ/(kg·K), the frictional melt resistance is reduced. When the specific heat is 0.95 kJ/(kg·K) or more, the speed at which the temperature of the surface resin layer in which the spherical fine particles are included is increased due to frictional heat is suppressed.

Specific examples of the spherical fine particles having a heat resistance at 200° C., and a specific heat of 0.95 kJ/(kg·K) or more include melamine resin-silica composite particles, benzoguanamine resin particles, and polytetrafluoroethylene (PTFE) resin particles. These particles are preferably crosslinked spherical resin fine particles. Note that the term "spherical" does not necessarily mean to be true spheres, but means not to be at least particles produced by crushing, such as flaky particles. Among these, melamine resin-silica composite particles are particularly preferable in that, due to the presence of silica in the particles surface, the particles are less likely to be fused to each other even at a temperature exceeding 200° C.

Also, the spherical fine particles have a particle size $D_{50}$ (median diameter) at a cumulative distribution of 50 vol %, of 2.5 to 10 μm, and a particle size $D_{10}$ at a cumulative distribution of 10 vol % of the spherical fine particles satisfies a condition that a particle size dispersity $D_{50}/D_{10} \leq 3$. When the spherical fine particles having a heat resistance at 200° C. and a specific heat of 0.95 kJ/(kg·K) or more have such a particle size and a particle size dispersity that is sharply controlled, the frictional melt resistance is improved.

The particle size $D_{50}$ (median diameter) of the spherical fine particles is 2.5 to 10 μm. When the particle size $D_{50}$ exceeds 10 μm, the surface of the surface resin layer is roughened, so that the abrasion resistance is likely to be reduced, or coarse particles become visible, so that the quality of the appearance is likely to be reduced. When a surface resin layer is formed by coating, linear irregularities are likely to be formed on the surface. When the particle size $D_{50}$ is smaller than 2.5 μm, the ratio of minute particles, which contribute less to the improvement of the frictional melt resistance, is increased, so that it is difficult to achieve a sufficient effect.

The spherical fine particles are fine particles that are controlled to have a sharp particle size distribution so as to satisfy a condition that the particle size dispersity $D_{50}/D_{10} \leq 3$. When the particle size dispersity of the spherical fine particles is $D_{50}/D_{10} > 3$, the ratio of the fine particles having a particle size of $D_{10}$ or less becomes relatively high. The fine particles having a particle size of $D_{10}$ or less contribute less to the improvement of the frictional melt resistance. Therefore, in order to achieve high frictional melt resistance, the mixing ratio of the spherical fine particles needs to be increased. In that case, the bending resistance is likely to be reduced.

The surface resin layer contains an elastic polymer including a polyether-based polyurethane.

The polyether-based polyurethane can be obtained by reacting a urethane raw material containing a polymer polyol including a polyether-based polyol, an organic polyisocyanate, and a chain extender.

Specific examples of the polyether-based polyol include polyethylene glycol, polypropylene glycol, polytetramethylene glycol, and poly(methyl tetramethylene glycol).

Specific examples of the organic polyisocyanate include hardly yellowing diisocyanates, including, for example, aromatic diisocyanates such as 2,4-tolylene diisocyanate, 2,6-tolylene diisocyanate, 4,4'-diphenylmethane diisocyanate, and xylylene diisocyanate; and non-yellowing diisocyanates, including, for example, aliphatic or alicyclic diisocyanates such as hexamethylene diisocyanate, isophorone diisocyanate, norbornene diisocyanate, and 4,4'-dicyclohexyl methane diisocyanate.

Specific examples of the chain extender include diamines such as hydrazine, ethylene diamine, propylene diamine, hexamethylene diamine, nonamethylene diamine, xylylene diamine, isophorone diamine, piperazine and derivatives thereof, adipic acid dihydrazide, and isophthalic acid dihydrazide; triamines such as diethylenetriamine; tetramines such as triethylene tetramine; diols such as ethylene glycol, propylene glycol, 1,4-butanediol, 1,6-hexanediol, 1,4-bis(β-hydroxyethoxy)benzene, and 1,4-cyclohexanediol; triols such as trimethylol propane; tetraols such as pentaerythritol; and amino alcohols such as amino ethyl alcohol and amino propyl alcohol.

The ratio of the polyether-based polyurethane included in the elastic polymer contained in the surface resin layer is preferably 60 mass % or more, more preferably 80 mass % or more, and particularly preferably 90 to 100 mass %, from the viewpoint of ease of maintaining a particularly high bending resistance. Examples of the elastic polymer other than the polyether-based polyurethane included in the elastic polymer include various elastic polymers including, for example, polyurethane other than a polyether-based polyurethane, such as a polyester-based polyurethane and a polycarbonate-based polyurethane, acrylic elastic bodies such as an acrylonitrile-butadiene copolymer, or a copolymer of an acrylic acid ester or a methacrylic acid ester, polyamide-based elastic bodies, and silicone rubber. The ratio of the polyether-based polyurethane contained in the surface resin layer is preferably 40 mass % or more, more preferably 50 mass % or more, and particularly preferably 60 mass % or more.

The content ratio of the spherical fine particles contained in the surface resin layer is 5 to 40 mass %. When the content ratio of the spherical fine particles in the surface resin layer is less than 5 mass %, the frictional melt resistance is not sufficiently improved. When the content ratio of the spherical fine particles in the surface resin layer exceeds 40 mass %, the bending resistance is likely to be reduced.

The surface resin layer may contain, as needed, various additives or the like such as an antioxidant, an ultraviolet absorber, a pigment, a dye, a surfactant, an antistatic agent, a flame retardant, an anti-tacking agent, a filler, and a crosslinking agent, as long as the effects of the present invention are not impaired.

The thickness of the surface resin layer is preferably 10 to 60 μm, and more preferably 15 to 45 μm, from the viewpoint of ease of obtaining a leather-like sheet with a surface having a combination of high frictional melt resistance, high bending resistance, and a natural leather-like flexible texture.

Referring to the FIGURE, the surface resin layer 4 is stacked on the fiber base material 1 via the adhesive layer 2 and the intermediate resin layer 3. The leather-like sheet according to the present embodiment can be produced, for example, by a method involving forming a surface resin layer on release paper, further forming an intermediate resin layer on the surface of the surface resin layer, further forming an adhesive layer on the surface of the intermediate resin layer, bonding the adhesive layer formed on the release paper to the surface of the fiber base material by pressure bonding, and subsequently releasing the release paper.

The intermediate resin layer is a layer composed mainly of an elastic polymer, and contains, as needed, various additives or the like such as an antioxidant, an ultraviolet absorber, a pigment, a dye, a surfactant, an antistatic agent, a flame retardant, an anti-tacking agent, a filler, and a crosslinking agent. The type of the elastic polymer forming the intermediate resin layer is not particularly limited, and examples thereof include various elastic polymers including, for example, polyurethane; acrylic elastic bodies such as an acrylonitrile-butadiene copolymer and a copolymer of an acrylic acid ester or a methacrylic acid ester; polyamide-based elastic bodies; and silicone rubber. Among these, polyurethane is preferable from the viewpoint of obtaining a good texture, and in particular, a polyether-based polyurethane is preferable from the viewpoint of ease of increasing the bending resistance.

The thickness of the intermediate resin layer is not particularly limited, but is preferably 10 to 60 μm, and more preferably 15 to 45 μm, from the viewpoint of ease of obtaining a leather-like sheet that offers a good balance between mechanical properties and the texture or the like.

The adhesive layer is also a layer composed mainly of an elastic polymer, and contains, as needed, various additives or the like such as an antioxidant, an ultraviolet absorber, a pigment, a dye, a surfactant, an antistatic agent, a flame retardant, an anti-tacking agent, a filler, and a crosslinking agent. The type of the elastic polymer forming the adhesive layer is also not particularly limited, and any adhesive that includes the same various elastic polymers as those described above, and that is composed mainly of an elastic polymer having a high adhesion strength to the fiber base material can be used without any particular limitation. As the elastic polymer serving as the main component of the adhesive layer, polyurethane is preferable from the viewpoint of obtaining a good texture, and in particular, a polyether-based polyurethane is preferable from the viewpoint of ease of increasing the bending resistance.

The thickness of the adhesive layer is not particularly limited, but is preferably 20 to 100 μm, and more preferably 30 to 90 μm, from the viewpoint of ease of obtaining a leather-like sheet that offers a good balance between the mechanical properties and the texture or the like.

The leather-like sheet according to the present embodiment described above has a combination of high frictional melt resistance and high bending resistance. In particular, a leather-like sheet can be obtained in which the number of cycles of a flexing endurance test at which cracking occurs in the surface resin layer is preferably 300000 or more, and more preferably 500000 or more, when the flexing endurance test is performed on the leather-like sheet in an environment of 20° C. using a flexometer.

EXAMPLES

Next, the present invention will be described in further detail by way of examples; however, the scope of the present invention is by no means limited by the following examples. First, the evaluation methods used in the present examples will be collectively described below.

(1) Heat Resistance at 200° C. of Spherical Fine Particles

Into a tray made of aluminum foil, 2 to 3 g of powder of the spherical fine particles used in each of the examples was weighed, and the tray was heated for 10 minutes in an electric heating dryer at 200° C. Then, after cooling the spherical fine particles, spherical fine particles that maintained the powder state, or spherical fine particles that were lightly fixed, but were loosened and returned to the powder state when a light force was applied thereto with a medicine spoon or the like were evaluated as A (with heat resistance at 200° C.). Spherical fine particles that melted to form a film, or spherical fine particles that were completely fused with each other, and did not return to the power state were evaluated as B (without heat resistance at 200° C.).

(2) Measurement of Particle Size and Particle Size Dispersity of Spherical Fine Particles The cumulative particle size distribution of the spherical fine particles used in each of the examples was measured by a dry method using a laser diffraction/scattering analyzer LA-950V2 (HORIBA, Ltd.). Then, from the measured cumulative particle size distribution, the particle size dispersity $D_{50}/D_{10}$ was determined, where $D_{50}$ was the particle size at a cumulative distribution of 50 vol % and $D_{10}$ was the particle size at a cumulative distribution of 10 vol %.

(3) Specific Heat of Spherical Fine Particles

The specific heat (kJ/(kg·K)) of the spherical fine particles used in each of the examples was measured using a differential scanning calorimeter DSC 8500 (PerkinElmer Co., Ltd.), in accordance with JIS K 7123: Testing methods for specific heat capacity of plastics.

(4) Frictional Melt Resistance

A strip-shaped test piece (3×6 cm) was cut out from the leather-like sheet obtained in each of the examples. Then, a roller made or cherry tree (diameter: 73 mm, width: 26 mm) rotating at 1800 rpm was brought into contact under a load of 2.0 lb (907 g) with the surface of the strip-shaped test piece on which the surface resin layer was formed. Then, the time from when the surface resin layer had melted until when the fiber base material was exposed was measured at intervals of 1 second (rounded off), up to a maximum of 10 seconds.

(5) Bending Resistance

The leather-like sheets obtained in each of the example was subjected to a bending resistance test in an environment of a relative humidity of 65±5% and a temperature of 2012° C., using a flexometer compliant with JIS K 6545. Specifically, the presence or absence of the occurrence of cracking in the surface of the leather-like sheet on which the surface resin layer was formed was checked for every 100000 flexing cycles performed by the flexometer. Cracking was visually checked using a 30× magnifier. Then, the number of cycles was determined as "Less than 100000 cycles" when cracking was confirmed at 100000 cycles, and as "100000 cycles" when cracking was confirmed at 200000 cycles. For the rest of the test, the determination was made in the same manner for every "100000 cycles". Note that each cycle was performed using three samples (N=3). Then, it was determined that cracking occurred when cracking occurred in one of the samples.

Example 1

A water-soluble thermoplastic polyvinyl alcohol was used as a sea component, and a PET having an isophthalic acid degree of modification of 6 mol % was used as an island component. Using a multicomponent fiber spinning spinneret, filaments of island-in-the-sea conjugated fibers were ejected from the spinneret at 260° C. such that the number of islands per one fiber was 25, and the sea component/island component was 25/75 (mass ratio). Then, the ejector pressure was adjusted such that the spinning rate was 4000 m/min, and the island-in-the-sea conjugated fibers having an average fineness of 2.5 dtex were collected on a net, to obtain a filament web having a basis weight of 30 g/m².

Then, the web was laid in 12 layers through cross lapping, and an oil for preventing the needle from breaking was sprayed thereto. Then, the layers of the web were needle punched with 6-barb needles at a punching density of 2000 punch/cm², to obtain an entangled web.

Then, the entangled web was heat-shrunk using steam. Specifically, first, water was added to the entangled web in an amount of 30 mass % relative to the mass of the sea component, then the entangled web was heat-treated for 80 seconds under a heated steam atmosphere of a relative humidity of 90% and a temperature of 110° C. The area shrinkage at this time was 45%.

Next, the heat-shrunk web was impregnated with a dispersion of an anionic self-emulsified, aqueous polyurethane (100% modulus: 3.0 MPa). The concentration of the dispersion of the aqueous polyurethane was such that the mass ratio of the aqueous polyurethan amount/island component amount was 10/90. Then, the dispersion of the aqueous polyurethane was subjected to gelation treatment under a steam atmosphere in order to prevent migration, and was subsequently dried for 10 minutes at 120° C.

Then, the web into which the aqueous polyurethane had been impregnated was immersed in hot water at 95° C. for 10 minutes, thereby removing the sea component to form ultrafine fibers. Then, the ultrafine fibers were dried for 10 minutes at a temperature of 120° C., thus obtaining a fiber base material including a non-woven fabric of ultrafine fibers with 0.1 dtex and having a thickness of 2.1 mm. Then, the fiber base material having a thickness of 2.1 mm was sliced on a plane substantially parallel to the surface of the fiber base material, thus obtaining a fiber base material including a non-woven fabric of ultrafine fibers with 0.1 dtex and having a thickness of 1.0 mm and a basis weight of 525 g/m$^2$.

Then, onto release paper having a pattern resembling skin pores, a coating liquid for forming a surface resin layer in which 100 parts by mass of a polyether-based polyurethane (PEt-based PU, RESAMINE ME-8116 (solid content: 30 mass %) manufactured by Dainichiseika Color & Chemicals Mfg. Co., Ltd.), 8.5 parts by mass of melamine resin-silica composite particles (OPTBEADS 6500M manufactured by Nissan Chemicals Industries, Ltd.), 30 parts by mass of DMF, 10 parts by mass of MEK, and 30 parts by mass of a black pigment dispersion (DUT-4794 (pigment content: 12 mass %) manufactured by Dainichiseika Color & Chemicals Mfg. Co., Ltd.) were blended was coated in a wet coating amount of 130 g/m$^2$ using a roll coater, and was dried. Thus, a surface resin layer was formed. The formed surface resin layer contained 20 mass % of the melamine resin-silica composite particles.

Next, onto the surface of the surface resin layer, a coating liquid for forming an intermediate resin layer in which 100 parts by mass of a polyether-based polyurethane (RESAMINE ME-8116 (solid content: 30 mass %) manufactured by Dainichiseika Color & Chemicals Mfg. Co., Ltd.), 30 parts by mass of DMF, 10 parts by mass of methyl ethyl ketone, and 30 parts by mass of a black pigment dispersion (DUT-4794 (pigment content: 12 mass %) manufactured by Dainichiseika Color & Chemicals Mfg. Co., Ltd.) were blended was coated in a wet coating amount of 105 g/m$^2$ using a roll coater, and was dried. Thus, an intermediate resin layer was formed.

Then, onto the surface of the intermediate resin layer, a coating liquid for forming an adhesive layer in which 100 parts by mass of a polyether-based polyurethane (RESAMINE UD-8310NTT (solid content: 60 mass %) manufactured by Dainichiseika Color & Chemicals Mfg. Co., Ltd.), 10 parts by mass of an isocyanate crosslinking agent (NE crosslinking agent manufactured by Dainichiseika Color & Chemicals Mfg. Co., Ltd.), 2 parts by mass of a crosslinking accelerator (UD-103 manufactured by Dainichiseika Color & Chemicals Mfg. Co., Ltd.), 30 parts by mass of DMF, and 20 parts by mass of MEK were blended was coated in a wet coating amount 150 g/m$^2$ using a roll coater, and subsequently was dried for 2 minutes at 80° C. The adhesive layer in a semi-dried state was attached to the surface of the fiber base material, and was further dried for 5 minutes at 130° C. Thereafter, in order to accelerate the crosslinking reaction of the adhesive layer, the whole was heated for 48 hours in a dryer at an atmospheric temperature of 60° C. Then, the release paper was stripped off to expose the surface resin layer.

Thus, a leather-like sheet having a thickness of about 1 mm was obtained. A cross section of the obtained leather-like sheet was observed with a scanning electron microscope (300×). The film thicknesses of randomly selected 30 portions were measured, and the average value of the measured values was obtained. The thickness of the surface resin layer was 30 μm, the thickness of the intermediate resin layer was 30 μm, and the thickness of the adhesive layer was 60 μm.

Then, the properties of the obtained leather-like sheet were evaluated by the above-described evaluation methods. The evaluation results are shown in Table 1.

TABLE 1

| Example No. | Elastic polymer in surface resin layer | Film thickness of surface resin layer (μm) | Type of fine particles | Heat resistance at 200° C. | Particle size distribution | | | Specific heat (kJ/(kg·K)) | Amount added (mass %) | Frictional melt resistance (sec) | Bending resistance (number of cycles) |
|---|---|---|---|---|---|---|---|---|---|---|---|
| | | | | | $D_{10}$ (μm) | $D_{50}$ (μm) | $D_{50}/D_{10}$ | | | | |
| Ex. 1 | PEt-based PU 100% | 30 | Melamine resin-silica composite particles | A | 5.2 | 5.5 | 1.06 | 1.58 | 20 | 10 or more | 500000 |
| Ex. 2 | PEt-based PU 100% | 30 | Benzoguanamine resin particles | A | 2.7 | 4.9 | 1.81 | 1.68 | 20 | 8 | 500000 |
| Ex. 3 | PEt-based PU 100% | 30 | Melamine resin-silica composite particles | A | 5.2 | 5.5 | 1.06 | 1.58 | 5 | 5 | 500000 |
| Ex. 4 | PEt-based PU 100% | 30 | Melamin resin-silica composite particles | A | 5.2 | 5.5 | 1.06 | 1.58 | 40 | 10 or more | 300000 |
| Ex. 5 | PEt-based PU 100% | 30 | PTFE particles | A | 1.3 | 3.2 | 2.46 | 0.96 | 20 | 8 | 500000 |

TABLE 1-continued

| Example No. | Elastic polymer in surface resin layer | Film thickness of surface resin layer (μm) | Type of fine particles | Heat resistance at 200° C. | Particle size distribution | | | Specific heat (kJ/(kg·K)) | Amount added (mass %) | Frictional melt resistance (sec) | Bending resistance (number of cycles) |
|---|---|---|---|---|---|---|---|---|---|---|---|
| | | | | | $D_{10}$ (μm) | $D_{50}$ (μm) | $D_{50}/D_{10}$ | | | | |
| Ex. 6 | PEt-based PU 100% | 60 | Melamine resin-silica composite particles | A | 5.2 | 5.5 | 1.06 | 1.58 | 20 | 10 or more | 500000 |
| Ex. 7 | PEt-based PU 100% | 80 | Melamine resin-silica composite particles | A | 5.2 | 5.5 | 1.06 | 1.58 | 20 | 10 or more | 500000 |
| Com. Ex. 1 | PEt-based PU 100% | 30 | None | — | — | — | — | — | — | Less than 1 | 500000 |
| Com. Ex. 2 | PEt-based PU 100% | 30 | Melamine resin particles | A | 1.4 | 4.9 | 3.50 | 1.64 | 20 | 2 | 500000 |
| Com. Ex. 3 | PEt-based PU 100% | 30 | Melamine resin-silica composite particles | A | 5.2 | 5.5 | 1.06 | 1.58 | 3 | 1 | 500000 |
| Com. Ex. 4 | PEt-based PU 100% | 30 | Melamine resin-silica composite particles | A | 5.2 | 5.5 | 1.06 | 1.58 | 50 | 10 or more | Less than 100000 |
| Com. Ex. 5 | PEt-based PU 100% | 30 | PMMA particles | B | 2.2 | 5.1 | 2.32 | 1.45 | 20 | Less than 1 | 500000 |
| Com. Ex. 6 | PEt-based PU 100% | 30 | Aluminum flake | A | 2.5 | 7.0 | 2.80 | 0.90 | 20 | Less than 1 | 500000 |
| Com. Ex. 7 | PC-based PU 100% | 30 | Melamine resin-silica composite particles | A | 5.2 | 5.5 | 1.06 | 1.58 | 20 | 10 or more | Less than 100000 |
| Com. Ex. 8 | PC-based PU 100% | 30 | Benzoguanamine resin particles | A | 0.9 | 2.0 | 2.22 | 1.65 | 33 | 2 | Less than 100000 |
| Com. Ex. 9 | PC-based PU 100% | 30 | Melamine resin particles | A | 0.8 | 1.2 | 1.50 | 1.67 | 50 | 2 | Less than 100000 |
| Com. Ex. 10 | PEt-based PU 100% | 30 | Melamine resin-silica composite particles | A | 6.4 | 10.5 | 1.64 | 1.58 | 20 | 10 or more | 200000 |

Example 2

A leather-like sheet was produced and evaluated in the same manner as in Example 1 except that benzoguanamine resin particles (EPOSTAR M05 manufactured by NIPPON SHOKUBAI CO., LTD.) were blended in the surface resin layer in place of the melamine resin-silica composite particles (OPTBEADS 6500M manufactured by Nissan Chemicals Industries, Ltd) in Example 1. The results are shown in Table 1.

Example 3

A leather-like sheet was produced and evaluated in the same manner as in Example 1 except that 5 mass % of the melamine resin-silica composite particles were included in the surface resin layer instead of including 20 mass % of the melamine resin-silica composite particles in Example 1. The results are shown in Table 1.

Example 4

A leather-like sheet was produced and evaluated in the same manner as in Example 1 except that 40 mass % of the melamine resin-silica composite particles were included in the surface resin layer instead of including 20 mass % of the melamine resin-silica composite particles in Example 1. The results are shown in Table 1.

Example 5

A leather-like sheet was produced and evaluated in the same manner as in Example 1 except that PTFE particles (Microdispers-3000 manufactured by Polysciences) were blended in the surface resin layer in place of the melamine resin-silica composite particles (OPTBEADS 6500M manufactured by Nissan Chemicals Industries, Ltd.) in Example 1. The results are shown in Table 1.

Example 6

A leather-like sheet was produced and evaluated in the same manner as in Example 1 except that the film thickness of the surface resin layer was changed from 30 μm to 60 μm in Example 1. The results are shown in Table 1.

Example 7

A leather-like sheet was produced and evaluated in the same manner as in Example 1 except that the film thickness of the surface resin layer was changed from 30 μm to 80 μm in Example 1. The results are shown in Table 1.

Comparative Example 1

A leather-like sheet was produced and evaluated in the same manner as in Example 1 except that the melamine resin-silica composite particles (OPTBEADS 6500M manufactured by Nissan Chemicals Industries, Ltd.) were not blended in the surface resin layer in Example 1. The results are shown in Table 1.

Comparative Example 2

A leather-like sheet was produced and evaluated in the same manner as in Example 1 except that melamine resin particles (PERGOPAK M4 manufactured by Huber Engineered Materials) were blended in the surface resin layer in place of the melamine resin-silica composite particles (OPTBEADS 6500M manufactured by Nissan Chemicals Industries, Ltd.) in Example 1. The results are shown in Table 1.

Comparative Example 3

A leather-like sheet was produced and evaluated in the same manner as in Example 1 except that 3 mass % of the melamine resin-silica composite particles were included in the surface resin layer instead of including 20 mass % of the melamine resin-silica composite particles in Example 1. The results are shown in Table 1.

Comparative Example 4

A leather-like sheet was produced and evaluated in the same manner as in Example 1 except that 50 mass % of the melamine resin-silica composite particles were included in the surface resin layer instead of including 20 mass % of the melamine resin-silica composite particles in Example 1. The results are shown in Table 1.

Comparative Example 5

A leather-like sheet was produced and evaluated in the same manner as in Example 1 except that polymethyl methacrylate (PMMA) resin particles (TAFTIC AR650SX manufactured by Japan Exlan Co., Ltd.) were blended in the surface resin layer in place of the melamine resin-silica composite particles (OPTBEADS 6500M manufactured by Nissan Chemicals Industries, Ltd.) in Example 1. The results are shown in Table 1.

Comparative Example 6

A leather-like sheet was produced and evaluated in the same manner as in Example 1 except that aluminum flakes (TS-408PM manufactured by Toyo Aluminium K.K.) were blended in the surface resin layer in place of the melamine resin-silica composite particles (OPTBEADS 6500M manufactured by Nissan Chemicals Industries, Ltd.) in Example 1. The results are shown in Table 1.

Comparative Example 7

A leather-like sheet was produced and evaluated in the same manner as in Example 1 except that 100 parts by mass of a polycarbonate-based polyurethane (PC-based PU, RESAMINE ME-8210NS (solid content: 30 mass %) manufactured by Dainichiseika Color & Chemicals Mfg. Co., Ltd.) was blended as the elastic polymer blended in the surface resin layer in place of 100 parts by mass of the polyether-based polyurethane (RESAMINE ME-8116 (solid content: 30 mass %) manufactured by Dainichiseika Color & Chemicals Mfg. Co., Ltd.) in Example 1. The results are shown in Table 1.

Comparative Example 8

A leather-like sheet was produced and evaluated in the same manner as in Example 1 except that 100 parts by mass of a polycarbonate-based polyurethane (RESAMINE ME-8210NS (solid content: 30 mass %) manufactured by Dainichiseika Color & Chemicals Mfg. Co., Ltd.) was blended as the elastic polymer blended in the surface resin layer in place of 100 parts by mass of the polyether-based polyurethane (RESAMINE ME-8116 (solid content: 30 mass %) manufactured by Dainichiseika Color & Chemicals Mfg. Co., Ltd.), and 33 mass % of benzoguanamine resin particles (EPOSTAR MS manufactured by NIPPON SHOKUBAI CO., LTD.) were included instead of including 20 mass % of the melamine resin-silica composite particles (OPTBEADS 6500M manufactured by Nissan Chemicals Industries, Ltd.) in Example 1. The results are shown in Table 1.

Comparative Example 9

A leather-like sheet was produced and evaluated in the same manner as in Example 1 except that 100 parts by mass of a polycarbonate-based polyurethane (RESAMINE ME-8210NS (solid content: 30 mass %) manufactured by Dainichiseika Color & Chemicals Mfg. Co., Ltd.) was blended as the elastic polymer blended in the surface resin layer in place of 100 parts by mass of the polyether-based polyurethane (RESAMINE ME-8116 (solid content: 30 mass %) manufactured by Dainichiseika Color & Chemicals Mfg. Co., Ltd.), and 50 mass % of melamine resin particles (EPOSTAR S12 manufactured by NIPPON SHOKUBAI CO., LTD.) were included instead of including 20 mass % of the melamine resin-silica composite particles (OPTBEADS 6500M manufactured by Nissan Chemicals Industries, Ltd.) in Example 1. The results are shown in Table 1.

Comparative Example 10

A leather-like sheet was produced and evaluated in the same manner as in Example 1 except that melamine resin-silica composite particles (OPTBEADS 10500M manufactured by Nissan Chemicals Industries, Ltd.) were blended in the surface resin layer in place of the melamine resin-silica composite particles (OPTBEADS 6500M manufactured by Nissan Chemicals Industries, Ltd) in Example 1. The results are shown in Table 1.

Referring to Table 1, all of the leather-like sheets obtained in Examples 1 to 7, which included a surface resin layer containing a polyether-based polyurethane and spherical fine particles having a heat resistance at 200° C., and in which a content ratio of the spherical fine particles of 5 to 40 mass %, the spherical fine particles had a specific heat of 0.95 kJ/(kg·K) or more, and a particle size $D_{50}$ (median diameter) at a cumulative distribution of 50 vol %, of 2.5 to 10 μm, and a particle size $D_{10}$ at a cumulative distribution of 10 vol % of spherical fine particles satisfied a condition that a particle size dispersity $D_{50}/D_{10} \leq 3$, had a frictional melt resistance of 5 seconds or more, and a bending resistance of 300000 or more. On the other hand, the leather-like sheet of Comparative Example 1, which included a surface resin layer in which spherical fine particles were not blended, had a frictional melt resistance of less than 1 second. The leather-like sheet of Comparative Example 2, which included a surface resin layer containing spherical fine particles that did not satisfy a condition that a particle size dispersity $D_{50}/D_{10} \leq 3$, had a frictional melt resistance of 2 seconds. The leather-like sheet of Comparative Example 3, which included a surface resin layer containing 3 mass % of spherical fine particles, had a frictional melt resistance of 1 second. The leather-like sheet of Comparative Example 4, which included a surface resin layer containing 50 mass % of spherical fine particles, had a bending resistance of less than 100000. The leather-like sheet of Comparative Example 5, which included a surface resin layer containing PMMA particles, which were spherical fine particles that did not have a heat resistance at 200° C., had a frictional melt resistance of less than 1 second. The leather-like sheet of Comparative Example 6, which included a surface resin layer containing aluminum flakes having a specific heat of less than 0.95 kJ/(kg·K), had a frictional melt resistance of less than 1 second. All of the leather-like sheets of Comparative Examples 7 to 9, which included a surface resin layer containing a polycarbonate-based polyurethane, had a bending resistance of less than 100000. The leather-like sheet of Comparative Example 10, in which $D_{50}$ exceeded 10 μm, had a bending resistance of 100000. In addition, the particles formed stripe-like irregularities on the surface of the coating film when the coating liquid was coated using the roll coater.

REFERENCE SIGNS LIST

1 . . . Fiber base material
2 . . . Adhesive layer
3 . . . Intermediate resin layer
4 . . . Surface resin layer
5 . . . Grain-finished resin layer
4a . . . Spherical fine particles
10 . . . Leather-like sheet

The invention claimed is:

1. A leather-like sheet, comprising:
a fiber base material;
an intermediate resin layer stacked on one surface of the fiber base material; and
a surface resin layer stacked on the intermediate resin layer,
wherein the surface resin layer comprises a polyether-based polyurethane and spherical fine particles having a heat resistance at 200° C., and a content ratio of the spherical fine particles is 5 to 40 mass %, and
the spherical fine particles has a specific heat of 0.95 KJ/(kg·K) or more, and a particle size $D_{50}$ (median diameter) at a cumulative distribution of 50 vol %, of 2.5 to 10 μm, and a particle size $D_{10}$ at a cumulative distribution of 10 vol % of the spherical fine particles satisfies a condition that a particle size dispersity $D_{50}/D_{10} \leq 3$ wherein the spherical fine particles comprise melamine resin-silica composite particles.

2. The leather-like sheet according to claim 1, wherein the surface resin layer has a thickness of 10 to 60 μm.

3. The leather-like sheet according to claim 1, wherein the number of cycles of a flexing endurance test at which cracking occurs in the surface resin layer is 300,000 or more, when the flexing endurance test is performed on the leather-like sheet in an environment of 20° C. using a flexometer.

4. The leather-like sheet according to claim 1, wherein the fiber base material comprises a non-woven fabric including ultrafine fibers having a fineness of 0.5 dtex or less, and an elastic polymer impregnated in the non-woven fabric.

5. The leather-like sheet according to claim 1, wherein said surface resin layer is formed by wet coating.

6. The leather-like sheet according to claim 1, wherein said spherical fine particles are dispersed in said polyether-based polyurethane.

* * * * *